UNITED STATES PATENT OFFICE.

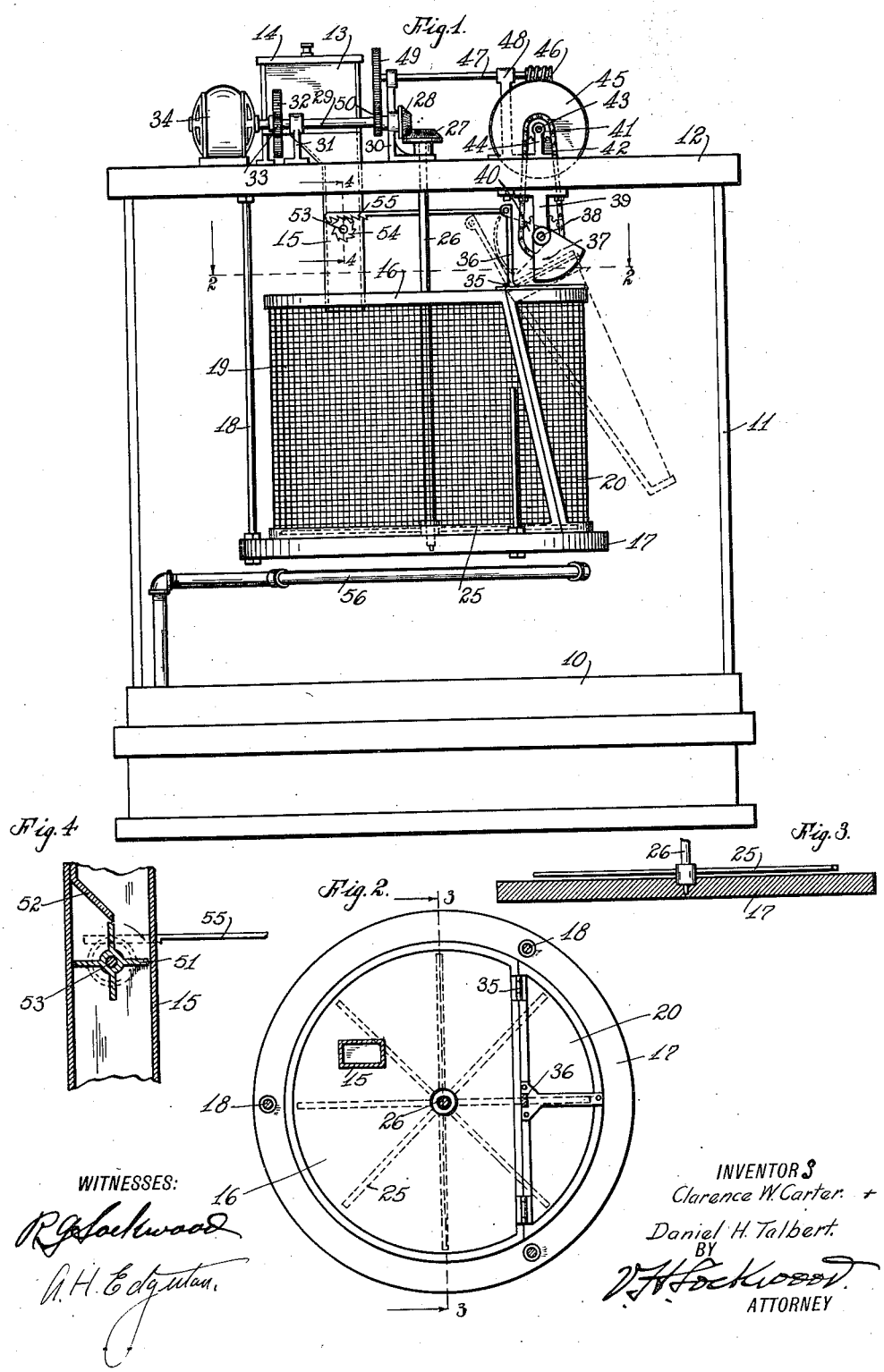

DANIEL H. TALBERT, OF INDIANAPOLIS, INDIANA, AND CLARENCE W. CARTER, OF MINNEAPOLIS, MINNESOTA, ASSIGNORS TO HOLCOMB & HOKE MANUFACTURING COMPANY, OF INDIANAPOLIS, INDIANA, A CORPORATION.

CORN-POPPING MACHINE.

1,272,725.   Specification of Letters Patent.   Patented July 16, 1918.

Application filed February 25, 1915. Serial No. 10,533.

*To all whom it may concern:*

Be it known that we, DANIEL H. TALBERT, a citizen of the United States, and a resident of Indianapolis, county of Marion, and State of Indiana, and CLARENCE W. CARTER, a citizen of the United States of America, and a resident of Minneapolis, county of Hennepin, and State of Minnesota, have invented a certain new and useful Corn-Popping Machine; and we do hereby declare that the following is a full, clear, and exact description thereof, reference being had to the accompanying drawings, in which like letters refer to like parts.

The object of this invention is to improve the construction and operation of corn popping machines so as to render them more completely automatic and compact than like machines heretofore in use.

This machine automatically supplies the corn to the popper and the corn feeding means operates intermittently and this operation is controlled by means controlling the discharge of the popped corn from the popping plate.

Another feature of the invention consists in having a rimless popping plate, herein shown stationary and circular, and fingers or stirring blades operating immediately above the popping plate, herein shown revoluble, for the purpose of agitating the corn and also discharging the popped corn over the margin of the popping plate. Coöperating with this arrangement is the provision of a cover or cage for the popping plate adapted to be opened at the proper time to permit such discharge of the popped corn. A section of such cover or cage is adapted to be open in the mechanism herein shown.

The full nature of the invention will be understood from the accompanying drawings and the following description and claims:

In the drawings, Figure 1 is an elevation of the machine. Fig. 2 is a section on the line 2—2 of Fig. 1. Fig. 3 is a section on the line 3—3 of Fig. 2, with the cover or cage omitted. Fig. 4 is a vertical section through a portion of the chute through which popcorn is fed from the hopper to the popping apparatus.

There is shown herein a case having a bottom portion 10, glass sides 11 and a top 12. Upon the top there is a hopper 13 for the corn having a removable lid 14 and a chute 15 extends downward therefrom through the top 12 of the main casing of the machine and through the stationary top 16 of the cage or cover of the popping apparatus for supplying corn to the latter.

Within the main casing there is a stationary circular popping plate 17 suspended from the top 12 by rods 18. Upon the popping plate there is a cover or cage adapted to retain the popped corn until it is desired for the same to be discharged and then the cage is opened up or elevated for the purpose of discharging the popped corn. In the particular form herein shown only a portion of the cage is open, the large portion of the side wall 19 of the cage being stationary and secured upon the plate 17 and the top 16 secured upon the side wall 19. The portion 20 of the cage adapted to be open constitutes about one-third of the total cage and it is hinged at its upper end to the stationary portion of the top 16 so that said opening section may be elevated or lifted or tilted upward to the position shown by dotted lines in Fig. 1 and permit the discharge of the popped corn over the margin of the plate 17 upon the bottom 10 of the main casing.

Immediately above the popping plate 17 there are stirring blades or agitating fingers 25, herein eight being shown, radiating from and secured to a central vertical shaft 26 which has bearing at its lower end in the center of the popping plate 17 and which extends up through the top 16 of the cage and the top 12 of the main casing and has a bevel gear 27 on its upper end driven by a bevel gear 28 on a shaft 29 in the bearing brackets 30 and 31. Said shaft has a large gear 32 thereon driven by a pinion 33 on the shaft of a motor 34 that reduces the speed of the shaft 29 so that the stirring blades 26 revolve slowly and as they revolve they stir the popcorn while it is being popped. After the corn is popped, the cage or the section 20 thereof is automatically opened and then the popped corn will be discharged through the opening in the cage over the margin of the popping plate by the centrifugal action of the stirring blades.

The section 20 of the cage is opened by the following means: The opening section 20 of the cage is hinged at its top to the stationary portion 16 of the top of the cage by spring hinges 35, the springs being arranged to close said section after it has been opened. A plate 36 extends upward from said opening section 20 of the cage in position to be engaged by a cam plate 37 one time during each revolution of such cam plate, as indicated by dotted lines in Fig. 1. Said cam plate 37 pushes against the extension plate 36 and tilts the section 20 of the cage outward and upward to the dotted line position shown in Fig. 1. The cam plate 37 is secured on a shaft 38 which is mounted in a bracket 39 and is driven by a sprocket wheel 40 and a sprocket chain 42 running from a sprocket wheel 41 on a shaft 43 in a bearing 44 on top of the main casing and that is driven by a worm wheel 45 on the shaft 43 and a worm 46 on a shaft 47 mounted in the bearings 48 and 30 and having at its left-hand end a gear 49 meshing with a pinion 50 on the shaft 29 heretofore described. This gearing is such that the revoluble movement of the cam plate 37 is slow and, therefore, it times the opening of the cage and the discharge of the popped corn.

The closing movement of the cage section 20 operates the feed through chute 15 of the corn to be popped. In said chute, see Fig. 4, there is a rotary feeder 51 with four feeding blades moving in the direction of the arrow, and the corn is deflected by a plate 52 to the right-hand side and said feeder 51 has a shaft 53 with a toothed wheel 54 adapted to be engaged and operated by a rack bar 55 which is connected with the extension 26 from the cage section 20. As the cage closes, the rack bar 55 gives the feeder 51 a one-fourth revolution. As the section 20 of the cage opens, the rack bar 55 rides backward over the toothed wheel 54 without moving the feeder 51. The popping plate is heated from a gas pipe or burner 56.

The invention claimed is:

1. In a corn popping machine, a rimless popping plate, and radially extending means immediately above said plate, one of said elements being revolubly mounted with relation to the other, whereby said radially extending means will agitate and discharge the popped corn over the margin of the plate.

2. In a corn popping machine, a rimless circular popping plate, and radially extending means revoluble thereon, whereby said radially extending means will agitate and discharge the popped corn over the margin of the plate.

3. In a corn popping machine, a rimless popping plate, a cover thereon adapted to be raised for the discharge of the popped corn, and means coöperating with the popping plate for causing the discharge of the popped corn after the cover is raised.

4. In a corn popping machine, a rimless popping plate, radially extending means immediately above said plate, one of said elements being revolubly mounted with relation to the other, whereby said radially extending means will agitate and discharge the popped corn over the margin of the plate, and a cover for said popping plate adapted to be raised during the discharge of the popped corn.

5. In a corn popping machine, a rimless popping plate, a cover thereon adapted to be opened at the discharge point for the discharge of the popped corn, and means coöperating with the popping plate for causing the discharge of the popped corn after the cover is raised.

6. In a corn popping machine, a rimless popping plate, radially extending means immediately above said plate, one of said elements being revolubly mounted with relation to the other, whereby said radially extending means will agitate and discharge the popped corn over the margin of the plate, and a cover for said popping plate adapted to be opened at the discharge point during the discharge of the popped corn.

7. In a corn popping machine, a rimless popping plate, a cover thereon a portion of which is adapted to be raised and opened for the discharge of the popped corn, and means coöperating with the popping plate for causing the discharge of the popped corn over the margin of said plate through the opening caused by the raising of said portion of the cover.

8. In a corn popping machine, a rimless popping plate, a cover therefor, a portion of which is adapted to be raised and opened for the discharge of the popped corn, and rotatable radial stirring blades immediately above the popping plate which cause the popped corn to be discharged over the margin of the plate after said portion of the cover is raised.

9. In a corn popping plate, a stationary rimless circular popping plate, a shaft concentric therewith, stirring blades extending radially from said shaft immediately above the popping plate, and a cover for said plate with a side portion thereof adapted to be opened for the discharge of the popped corn by the movement of said stirring blades.

10. In a corn popping machine, popping apparatus having a suitable cover therefor adapted to be opened upwardly at the discharge point for the discharge of the popped corn, and means for feeding corn to said popping apparatus which is controlled by the closing movement of said cover.

11. In a corn popping machine, a popping plate, rotatable radial moving stirring blades immediately above said plate, a cover for said plate adapted to be opened upwardly at the discharge point to enable the popped corn to be discharged over the margin of the plate by the stirring blades, and means for feeding corn to said popping plate, which means is controlled by the closing movement of said cover.

12. In a corn popping machine, a popping plate, a cover therefor having a portion adapted to be opened upwardly for the discharge of the popped corn, means for feeding popcorn to the popping plate, and means actuated by the closing movement of said cover for operating said feeding means.

13. In a corn popping machine, a popping plate, a cover therefor having a portion adapted to be opened for the discharge of the popped corn, a hopper for the unpopped corn, a chute leading therefrom to the popping plate, means in said chute for controlling the feed of the unpopped corn through said chute, and means operated by the closing movement of the cover for causing the feeding movement of said feed controlling means.

14. In a corn popping machine, a popping plate, a cover therefor, a portion of which is rigid and a portion hinged at its upper end to the top of the rigid portion of the cover so that it will open outwardly and upwardly, a hopper, a chute leading therefrom to the popping plate, corn feeding means in said chute, an arm extending upwardly from the movable portion of the cover, and means pivoted therewith operatively connected with the corn feeding means for operating the latter when said portion of the cover is being closed.

15. In a corn popping machine, a rimless popping plate, radial stirring blades operative thereon for stirring and discharging the popped corn over the margin of the plate, a cover for said plate adapted to be opened for said discharge of the popped corn, and a common means for actuating said stirring blades and opening said cover.

16. In a corn popping machine, a rimless popping plate, radial stirring blades operative thereon for stirring and discharging the popped corn over the margin of the plate, a cover for said plate adapted to be opened for said discharge of the popped corn, and a common means for actuating said stirring blades and periodically opening said cover.

17. A corn popping machine including a rimless popping plate, radial stirring blades operable thereon, a cover on said plate, a portion of which is stationary and the side portion of which is hinged at the top so that the same will open outwardly and upwardly, and a common means for actuating said stirring blades and periodically opening said movable portion of the cover.

18. A corn popping machine including a rimless popping plate, radial stirring blades operative thereon, a cover on said plate, a portion of which is stationary and the side portion of which is hinged at the top so that the same will open outwardly and upwardly, means for actuating said stirring blades, an arm extending upwardly from the movable portion of the cover, revoluble means for engaging said arm and opening the door at each revolution of said means, and means driven by the same means that actuates the stirring blades for operating said cover opening means.

19. In a corn popping machine, a popping plate, a cover therefor having a side portion thereof adapted to be opened for the discharge of the popped corn, an upward extension from said cover, a chute for supplying popcorn to the popping plate, a rotatable feeder in said chute, means connected with said extension for operating said feeder, and a timing means for actuating said extension.

In witness whereof, we have hereunto affixed our signatures in the presence of the witnesses herein named.

DANIEL H. TALBERT.
CLARENCE W. CARTER.

Witnesses as to Talbert:
J. H. WELLS,
R. G. LOCKWOOD.
Witnesses as to Carter:
H. A. BOWMAN,
A. M. ROYAL.